(12) United States Patent
Sikka et al.

(10) Patent No.: US 9,269,011 B1
(45) Date of Patent: Feb. 23, 2016

(54) GRAPHICAL REFINEMENT FOR POINTS OF INTEREST

(71) Applicant: Amazon Technologies, Inc., Reno, NV (US)

(72) Inventors: Avnish Sikka, Acton, MA (US); James Sassano, Somerville, MA (US); Sonjeev Jahagirdar, Cambridge, MA (US); Pengcheng Wu, Marlborough, MA (US); Nicholas Randal Sovich, Baltimore, MD (US)

(73) Assignee: Amazon Technologies, Inc., Reno, NV (US)

( * ) Notice: Subject to any disclaimer, the term of this patent is extended or adjusted under 35 U.S.C. 154(b) by 263 days.

(21) Appl. No.: 13/764,646

(22) Filed: Feb. 11, 2013

(51) Int. Cl.
    *G06K 9/32* (2006.01)
(52) U.S. Cl.
    CPC ................... *G06K 9/3233* (2013.01)
(58) Field of Classification Search
    CPC ........................................................ G06K 9/00
    USPC ........................................................ 382/103
    See application file for complete search history.

(56) References Cited

U.S. PATENT DOCUMENTS

| | | | | |
|---|---|---|---|---|
| 8,566,325 | B1* | 10/2013 | Brewington | 707/743 |
| 2010/0135527 | A1* | 6/2010 | Wu et al. | 382/103 |
| 2010/0309225 | A1* | 12/2010 | Gray et al. | 345/633 |
| 2011/0165888 | A1* | 7/2011 | Shuman et al. | 455/456.1 |
| 2012/0183172 | A1* | 7/2012 | Stroila | 382/100 |
| 2013/0002649 | A1* | 1/2013 | Wu et al. | 345/419 |

* cited by examiner

*Primary Examiner* — Stephen R Koziol
*Assistant Examiner* — Delomia L Gilliard
(74) *Attorney, Agent, or Firm* — Novak Druce Connolly Bove + Quigg LLP

(57) ABSTRACT

Various embodiments crowd source images to cover various angles, zoom levels, and elevations of objects and/or points of interest (POIs) while under various lighting conditions. The crowd sourced images are tagged or associated with a particular POI or geographic location and stored in a database for use by an augmented reality (AR) application to recognize objects appearing in a live view of a scene captured by at least one camera of a computing device. The more comprehensive the database, the more accurately an object or POI in the scene will be recognized and/or tracked by the AR application. Accordingly, the more accurately an object is recognized and tracked by the AR application, the more smoothly and continuous the content and movement transitions thereof can be presented to users in the live view.

25 Claims, 6 Drawing Sheets

GRAPHICAL REFINEMENT FOR POINTS OF INTEREST

BACKGROUND

Users are increasingly utilizing electronic devices to obtain various types of information. For example, a user wanting to learn the name of a song playing in the background can cause a sample of that song to be recorded by an electronic device and uploaded to a song identification service for analysis. Likewise, a user wanting an answer to a question can use his voice to ask his device the question, such that the device will process the user's voice and retrieve the answer to the question. In a similar fashion, a user wanting to determine the availability of a book can capture an image of the book and upload that image to a book identification service for analysis. Accordingly, automated object recognition systems to recognize and track objects in an image or multiple frames of an image are ever becoming more sophisticated. Conventional systems have utilized feature-based object tracking algorithms, such as Scale-invariant feature transform (SIFT) or Speeded Up Robust Feature (SURF) algorithm, to identify distinguishing features (which are usually corners) and calculate descriptors (unique fingerprints) for each feature point. These systems identify hundreds of feature points and their corresponding descriptors are computed for each frame in a sequence of video, for example, and a computationally intensive algorithm, such as brute force matching or Random Sample Consensus (RANSAC) algorithm, is used to track these points from frame to frame. This has enabled various augmented reality applications to identify objects and points of interest within a live view and provide information about objects or points of interest in an overlay. In order to match the feature points identified by these algorithms to real-world objects, a computing device, or system in communication therewith, must compare the feature points to images stored for these real-world objects. Since there are so many objects and points of interest, image databases often lack images from all possible angles and under various types of lighting conditions. This often leads to unrecognized or misrecognized information and additionally leads to the misplacement of overlay information. This is particularly bothersome when panning across a scene since the misplaced and misrecognized information often leads to an erratic and discontinuous display of augmented reality information. Therefore, as technology advances and as people are increasingly using portable computing devices in a wider variety of ways, it can be advantageous to adapt the ways in which these image databases are populated to ensure they contain sufficient image coverage of objects and points of interest from various angles, zoom levels, elevations and under various lighting conditions for the accurate recognition and overlay placement of information to provide users with a smooth and continuous viewing experience.

BRIEF DESCRIPTION OF THE DRAWINGS

Various embodiments in accordance with the present disclosure will be described with reference to the drawings, in which.

DETAILED DESCRIPTION

Figure 1:
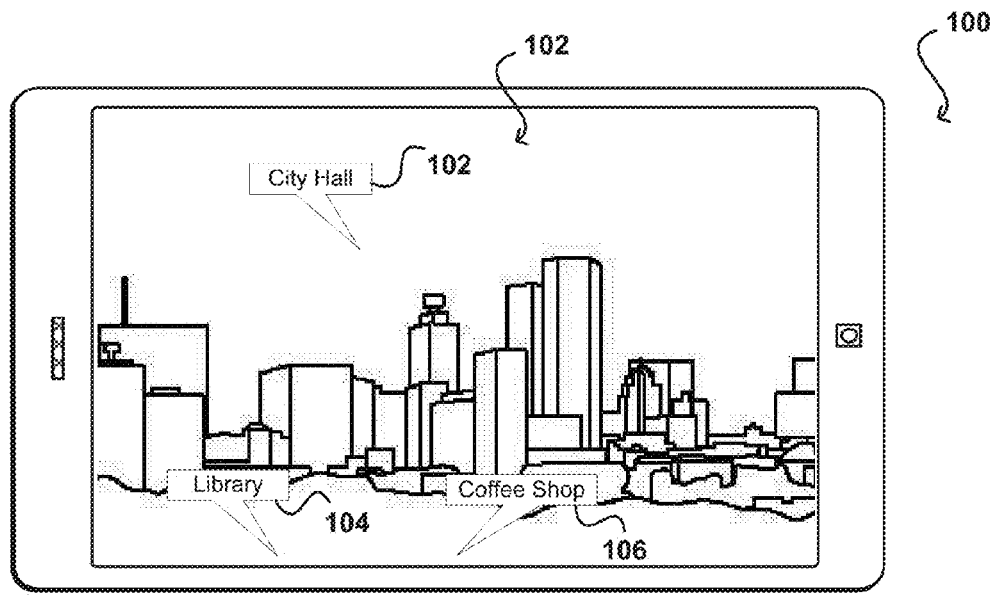
FIG. 1 illustrates an example augmented reality application view displayed on a computing device in accordance with at least one embodiment.

Systems and methods in accordance with various embodiments of the present disclosure may overcome one or more of the aforementioned and other deficiencies experienced in conventional approaches for enabling users to interact with a computing device. In particular, various embodiments crowd source images to cover various angles, zoom levels, and elevations of objects and/or points of interest (POIs) while under various lighting conditions. The crowd sourced images are tagged or associated with a particular POI or geographic location and stored in a database for use by an augmented reality (AR) application to recognize objects appearing in a live view of a scene captured by at least one camera of a computing device. The more comprehensive the database, the more accurately an object or POI in the scene will be recognized and/or tracked by the AR application. Accordingly, the more accurately an object is recognized and tracked by the AR application, the more smoothly and continuous the content and movement transitions thereof can be presented to users in the live view.

In at least one embodiment, an AR application executing on a computing device can attempt to identify POI within a given scene. As used herein, "scene" data refers to a collection of one or more types of data that reflects information about at least one object or point of interest, as well as a context or current environment in which a computing device capturing that information is located. In this example, an AR application executing on the computing device can enable the user to view a live, direct or indirect, view of various POI, such as items, products, landmarks, and the like within, or as an overlay to, the surrounding physical, real-world environment through a display screen. One or more algorithms for detecting features in an image, either on the computing device or on a server in communication therewith, can compare this information to the scene data or other information for images stored in a POI image database in order to recognize the POI and provide information for the same to be displayed to the user in response to a visual query for a particular scene. As mentioned above, since there are so many objects and POIs, the POI image database may lack reference images for particular angles and for various types of lighting conditions, which can lead to unrecognized or misrecognized objects or POIs and their associated information.

In at least one embodiment, a system can receive an image of the POI and recognize the POI in the image by comparing the received image to images stored in the POI image database. Once the POI is recognized, the received image can be aggregated with related images stored for the recognized POI in the POI image database. Aggregating the images can include stitching the images together to generate a three-dimensional model or the received image can be cataloged and stored for comparison against future visual searches. Further, a snap shot of sensor data can be captured at the time the received image was taken. The sensor data can be used to determine a view (i.e. angle, distance, etc.) from which the image of a POI was taken. Based at least in part on a location of the POI in the received image and the related images stored for a respective view of the POI, information for the POI, such as an AR banner, can be displayed for the POI in an overlay of the live view.

Various other functions and advantages are described and suggested below as may be provided in accordance with the various embodiments.

FIG. 1 illustrates an example screen shot of computing device 100 in accordance with at least one embodiment. Although a smart phone is shown, it should be understood that various other types of electronic or computing devices that are capable of determining and processing input can be used in accordance with various embodiments discussed herein. These devices can include, for example, tablet computers, notebook computers, desktop computers with a movable camera, personal data assistants, electronic book readers, video gaming controllers, and portable media players, among others. In this example, an augmented reality (AR) application is displaying a live view of a scene captured through at least one camera of the computing device 100. In this example, points of interest (POIs) (104, 106, and 108) have been identified and displayed to the user via the display 102. In various embodiments, one or more algorithms for detecting features in an image (and for tracking features), either on the computing device or on a server in communication therewith, can compare this information to information for images stored in a POI image database in order to recognize the POI and provide information for the same to be displayed to the user in response to a visual query for a particular scene. As mentioned above, since there are so many objects and POIs, the POI image database may lack reference images for particular angles and for various types of lighting conditions, which can lead to unrecognized or misrecognized objects and their associated information. In this example, the displayed locations of the banners (information) for the POIs (104, 106, and 108) are not accurate to the POI's actual location. This situation is often a product of a lack of image data for the POI from a particular angle, distance, under certain lighting conditions, and the like. Therefore, the more image data available, the more accurately placed the displayed banners for the POIs (104, 106, and 108) will be.

Figure 2:
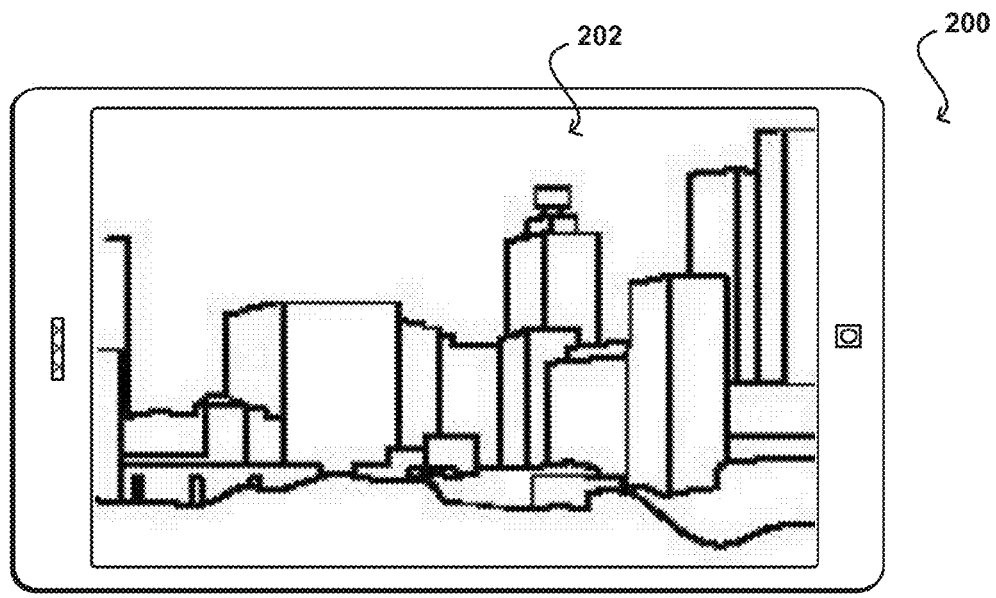
FIG. 2 illustrates an example image of a scene including POI taken by a user displayed on a computing device in accordance with at least one embodiment.
Figure 3:
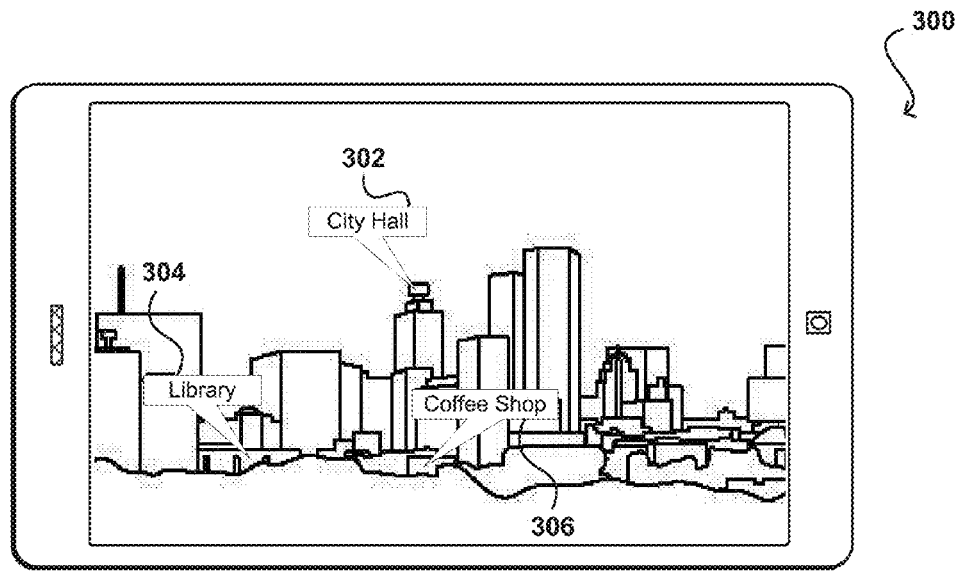
FIG. 3 illustrates another example augmented reality application view displayed on a computing device in accordance with at least one embodiment.

For example, consider the case where a user is holding the computing device 100 and viewing a scene, which includes multiple POIs, through an AR application. As the user pans across the scene, the position of the POI will change along with any associated identifying information provided in an AR overlay. If the POI image database does not have sufficient image or scene data for the POI currently being viewed, the POI will likely be inaccurately place, as illustrated in FIG. 1, and will likely not track smoothly since the computing device is likely relying on approximate locations of the POIs based on relative global positioning system (GPS) coordinates and insufficient image data. Therefore, in various embodiments, users can upload images of POIs to the POI image database to add to the database's comprehensiveness. For example, FIG. 2 illustrates an image 202 of a scene captured by a user on a computing device 200. In this example, after the user captures the image 202, the user can tag the image of a single POI (or POIs), associate the image with a geographic location, or the AR application can automatically associate the image with the user's current geographic location. Upon uploading the image 202, the image 202 is aggregated with information for the POI, POIs, or geographic location to facilitate in the future recognition of the POI or POIs for users utilizing the AR application. Over time, as more and more users upload images from different angles and views under various lighting conditions, the POI image database will become more comprehensive and the recognition and tracking feature of the AR application will become more robust as a result of the availability of more image data to cross reference and verify the identities of the POI from various angles and views. FIG. 3 shows an example screen shot of a live view of an AR application executing on a computing device 300 illustrating a possible resulting effect of a comprehensive POI database for the scene captured in FIG. 1. In this example, the POI banners (304, 306, and 308) are accurately placed as a result of the availability of sufficient image data store in the POI database. For example, the City Hall banner 302 is placed directly on the City Hall building instead of floating above the building; the library banner 304 is placed directly on the library building instead of underneath the same; and the Coffee Shop banner 306 is placed directly on the Coffee Shop building instead of underneath the same, as shown in FIG. 1. Various other methods, features, or approaches can be used to improve the recognition and tracking of objects and the placement of AR overlay information as well as discussed or suggested elsewhere herein.

Figure 4:
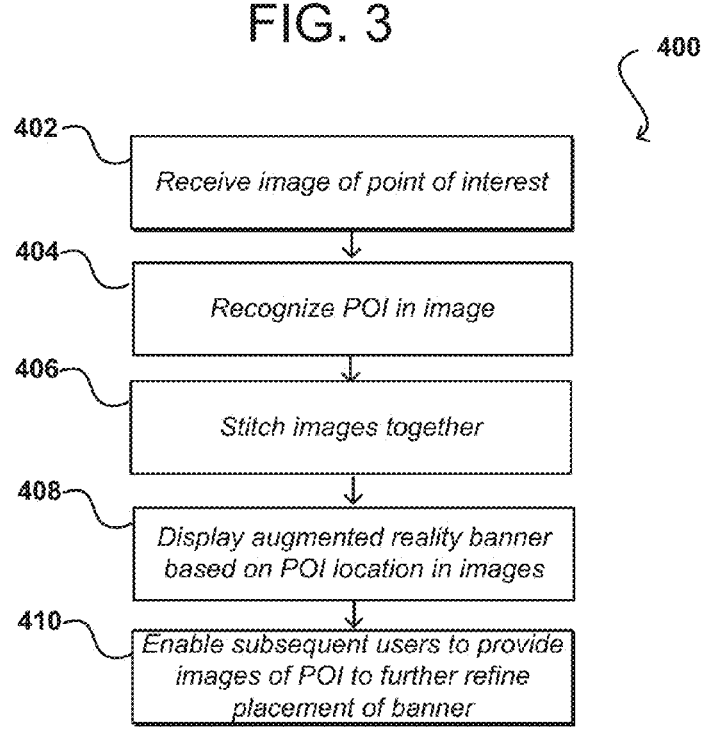
FIG. 4 illustrates an example process for improving point of interest recognition in an augmented reality application that can be used in accordance with at least one embodiment.

FIG. 4 illustrates an example process 400 for improving point of interest (POI) recognition in an augmented reality application that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, at least one image of a point of interest (POI) is uploaded by a user of a computing device 402. Before the at least one image is uploaded, the user can add a location tag or tag identifying the POI captured therein in order to associate the at least one image with the proper piece of POI data in the POI image database. This may also be done automatically by taking into account a user's geographic location, such as their latitude and longitude, GPS coordinates, and the like. In this example, the POI in the at least one image is recognized 404 by comparing the at least one image to images stored in a POI image database. In at least one example, the computing device can be preloaded (or cached) with images of POI within a predetermined distance of the users current location in order to narrow the number of images for comparison since the user would not be viewing a POI in another country, for example.

In at least one embodiment, comparing the at least one image to images stored in a POI image database can utilize a feature-based object recognition or tracking algorithm. These algorithms work by identifying 'interesting' or 'relatively unique' (at least locally) features of an object, which typically correspond to corners, intersection points, local minima or maxima, etc., and calculate descriptors, or unique fingerprints, of the object using a feature detection algorithm, such as Scale-invariant feature transform (SIFT) or Speeded Up Robust Feature (SURF) for each feature point. These unique fingerprints are determined for both the images in the POI image database, the at least one image uploaded by the user, and for objects that appear in a continuous stream of images when the user is utilizing the augmented reality (AR) application. Accordingly, an object is recognized when fingerprints from either the at least one user uploaded image or when an image from a stream of images in the AR application match fingerprints for at least one image stored in the POI image database. Geometric hashing can also be utilized to efficiently recognizing an object in an image or tracking an object from a reference image where the object is represented by a discrete set of points without calculating computationally expensive descriptors. Further, a snap shot of sensor data captured as the at least one image was capture can also be provided to the AR system in order to determine, for example, the orientation, direction of capture, distance from a POI, and the like to determine the type of view of the POI. Additionally, optical character recognition (OCR) algorithms and logo identification methods can also be used to verify POI within a scene when such information is available or present.

In this example, the at least one image is stitched or aggregated 406 with related images stored for the POI. This can include adding the at least one image to the POI database, but this may also including stitching the at least one image with other image views of the POI in the POI database in order to account for multiple views of the POI. For example, the fingerprints identified by SIFT or SURF can be matched with corresponding fingerprints to images or a three-dimensional model of the POI and stitched therewith. Further, the snap shot of sensor data can also be used to associate the at least one image with a particular side, angle, or view of the POI to facilitate the matching of the images. In this example, an augmented reality banner for the POI is displayed 408 in an overlay of a live view being captured with at least one camera of the computing device. The placement of the banner is determined at least in part on a location of the POI in the at least one image uploaded by the user and the related images stored for a respective view of the POI. Therefore, the more images captured from various angles, elevations, and distances and in various lighting conditions of the POI, the more accurate the placement of the banner as the POI is tracked in a live view of the AR application. Further, in this example, subsequent users are also enabled 410 to provide images of POI to further refine placement of the banner. Various other features or approaches can be used to improve the recognition and tracking of objects and the placement of AR overlay information as well as discussed or suggested elsewhere herein.

Further, various embodiments can use user behavior and statistical methods to account for error with respect to the proper recognition or identification of a piece of POI and/or the proper AR banner location placement. For example, a feedback loop can be provided by an AR system that provides feedback for user actions. If the AR system provides a user with information and that information is not acted upon in a way the system anticipated, the system can document the incident and, upon multiple users acting in a similar or same manner, changes can be made to the information or associated actions. For example, when a user requests information regarding directions to a particular POI and the system provides the request information it has stored, but the user actually goes somewhere else or takes a different route, the system can make note and adapt to optimize its knowledge or understanding of the environment. In another example, when a user uploads an image for a particular POI and either provides an incorrect tag or the image is incorrectly tag by the system when uploaded, the system can eventually or immediately correct the tag based at least in part on images already uploaded for a respective POI and/or subsequently uploaded images. In one example, the AR system can enable users to provide feedback to correct potentially incorrectly tagged POI. Upon receiving a threshold amount of feedback for a particular POI, the AR system can retag the POI with the user feedback consensus tag. The threshold amount of feedback in this context can include at least a number of individual user feedbacks from a number of different users, a particular majority percentage of votes for a different tag than the current tag, and the like. Further, the system could correct the tag for the POI, or alert the user that the POI could be incorrect, based on location information or from recognizing the object in the image. For example, a user who tags the Golden Gate Bridge as the Bay Bridge may be prompted by the system that the tag is potentially incorrect based on at least one of location information or image recognition. Additionally, upon uploading, the application could suggest known POI in the vicinity of the user based on the user's location for the user to select in order to increase the accuracy of the tag the POI is associated with. Various other feedback and adaptive features or approaches can be used or implemented within the scope of various embodiments discussed or suggested herein.

Figure 5:
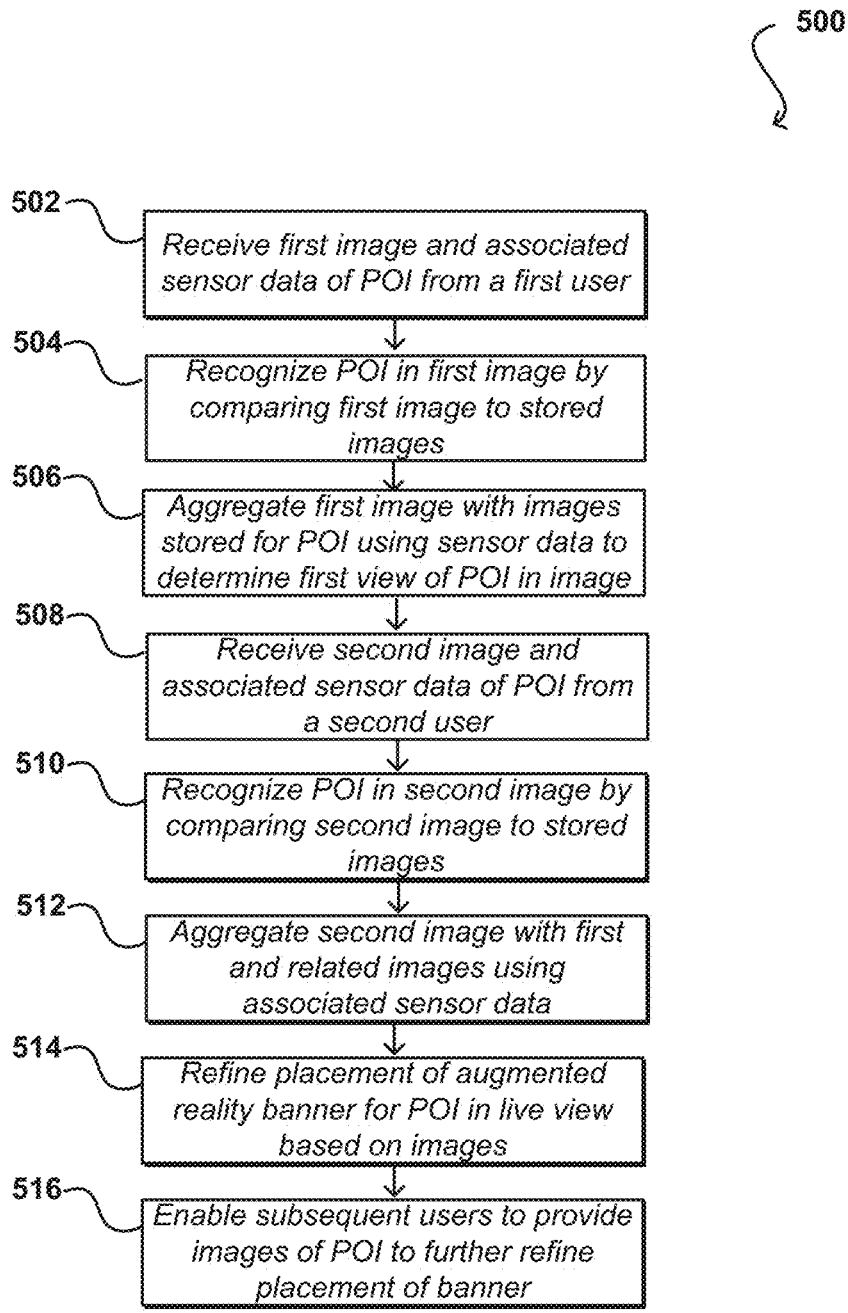
FIG. 5 illustrates an example process for improving point of interest recognition in an augmented reality application that can be used in accordance with at least one embodiment.

FIG. 5 illustrates an example process 500 for recognizing text in an image with a computing device that can be used in accordance with various embodiments. In this example, a first image and sensor data associated with the first image for a point of interest (POI) are received 502 from a first user of a first computing device. In this example, the POI is recognized 504 in the first image by comparing the first image to images stored in a POI database for POIs that are within a predetermined distance of the first computing device at or around the time of the first image is captured. The recognized first image is aggregated 506 with related images stored for the POI using the associated sensor data of the first image to determine a first view of the POI in the first image. As mentioned above, a snap shot of sensor data captured as the first image was capture can assist in determining the orientation, direction of capture, distance from the POI, and the like to determine the type of view of the POI that is captured in the first image. In this example, a second image and sensor data associated with the second image are received 508 from a second user of a second computing device and, as above, the POI is recognized 510 in the second image by comparing the second image to images stored in the POI database for POIs that are within a predetermined distance of the second computing device. In this example, the second image is aggregated 512 with the first image and the related images stored for the POI using the associated sensor data of the second image to determine a second view of the POI in the second image. In this example, based at least in part on the location of the POI in first image and the second image, placement of an augmented reality banner displayed in an overlay of a live view being captured with at least one camera of a third computing device is refined 514. Various other features or approaches can be used to improve the recognition and tracking of objects and the placement of AR overlay information as well as discussed or suggested elsewhere herein.

Figure 6:
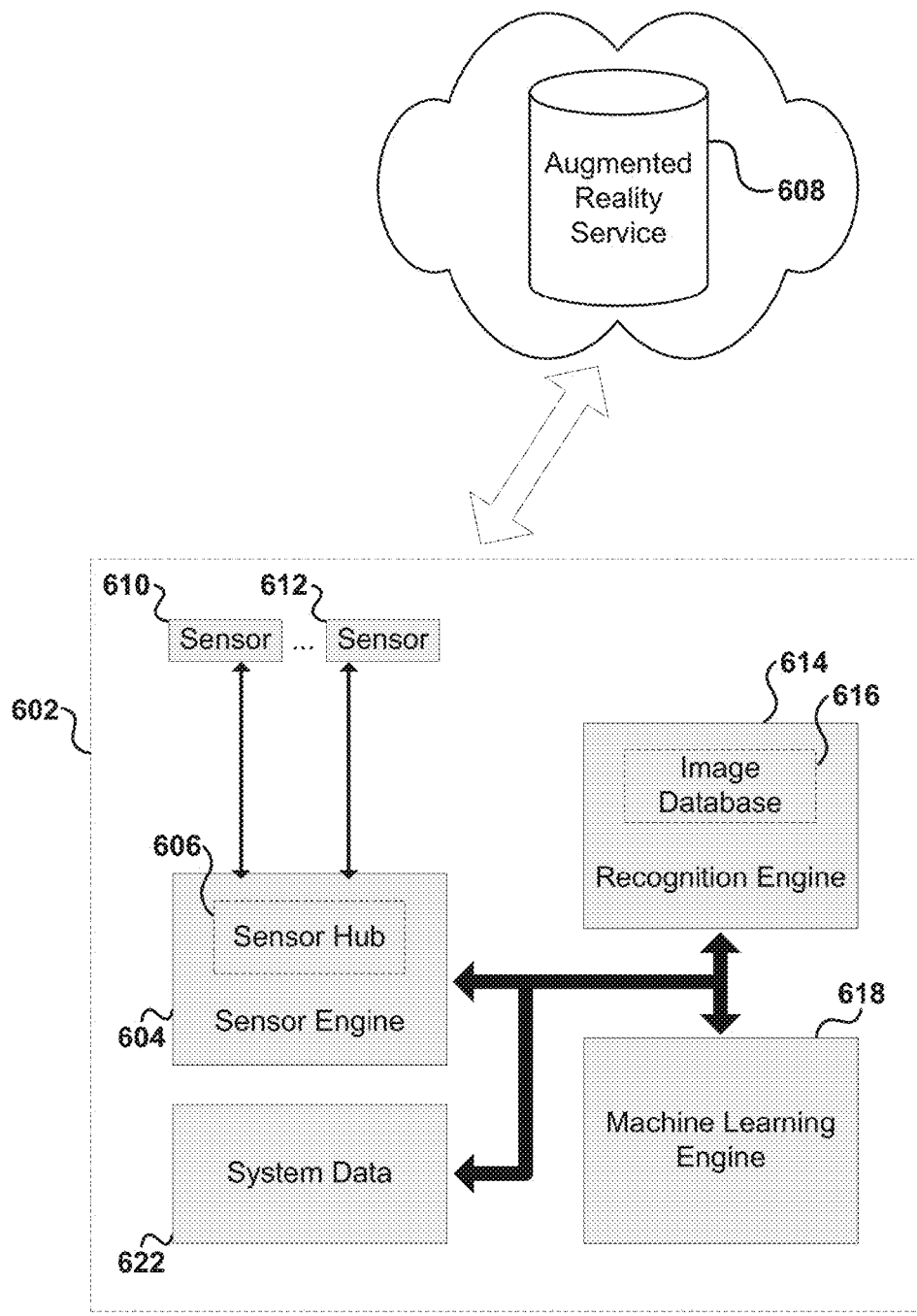
FIG. 6 illustrates an environment in which various embodiments can be implemented.

The recognition of POI from image data in the POI image database described with respect to FIGS. 1-3 can be identified by streaming (or otherwise transferring) an image, audio clip, and/or other electronic data to a system or service operable to find one or more potential matches for that data and provide related POI information for those potential matches. FIG. 6 illustrates an example system 600 for recognition, matching, and tracking. In this example, the system 600 comprises a sensor engine 604, a sensor hub 606, at least one sensor (e.g., 610, 612), a pattern recognition engine 614, a catalog 616, a machine learning context engine 618, and an augmented reality service 608. The sensor engine 604 can communicate with the sensor hub 606 to collect data from at least one sensor (e.g., 610, 612) in the device. The sensor hub 606 can be integrated with, or separate from, the sensor engine 604. The sensor hub 606 in this example can obtain data (e.g., context data) from the at least one sensor (e.g., 610, 612). In some embodiments, the at least one sensor (e.g., 610, 612) can sense data relating to location, motion, acceleration, orientation, pressure, imaging, ambient light, infrared light, sound, proximity, etc. This data can be context data to be received by the sensor hub 606 and the sensor engine 604.

The data from the at least one sensor (e.g., 610, 612) can be used by the machine learning engine 618 to determine the likely context of the user. For example, the machine learning engine 618 can receive context data such as location input from a GPS sensor to determine that the user is at, or near, a park, for example. The machine learning engine 618 can also use additional context data such as imaging input (e.g., picture, video) from an imaging sensor (e.g., camera, facial recognition software) to determine that the user's context is with his family at the park and pointing the computing device toward downtown. Further, the machine learning engine 618 can use sound data (e.g., music, voice, speech, background noise) from an audio sensor to determine that the context is with friends at a concert. Moreover, the machine learning engine 618 can utilize system data 622 as well, such as an internal clock, calendar, apps, reminders, notes, tasks, user activities (e.g., user preferences, messages, user interactions, etc.), and other such input. For example, if the user had noted on the internal calendar that he had a baseball game event at this time, then the machine learning engine 618 can further determine that there is a good likelihood that the user is attending the baseball game and pull up location and image information for associated POI. In some embodiments, the machine learning engine 618 can also track the user's history and previous contexts, to determine current context and/or predict future context to determine relevant POI to highlight or point out and provide further information to the user. In some embodiments, the machine learning engine 618 can be adaptive, learn over time, and determine/predict contexts more quickly and accurately in order to preload and cache POI and related information likely to be of interest to a user within the vicinity. Once the user's context is determined or predicted, the system can prepare for context dependent recognition and POI presentation.

In some embodiments, the machine learning engine 618 can be hardware assisted. In some embodiments, the machine learning engine 618 can use machine learning algorithms, pattern recognition and classification, to refine upon a standard set of user contexts both in breadth (i.e., new contexts for this specific user, e.g., "in the classroom," "in the office," etc.), as well as in depth (i.e., "shopping for brand ABC sports shoes at XYZ Mall," "in a sales meeting with the boss in the conference room at work," etc.).

The user may trigger context dependent recognition when upon entering the augmented reality application. The pattern recognition engine 614 can process such identification inquiries. In some embodiments, when a user submits an identification inquiry request, the pattern recognition engine 614 can search a collection of objects or POI in the relevant database 616 to find a match for the identification inquiry. The database 616 can include data relating to POIs and objects and the data can be categorized as belonging to one or more particular contexts. The database 616 can store a predetermined collection of object/POI data and/or it can store data downloaded from the recognition center 620. If the pattern recognition engine 614 does not find a match for the inquiry in the database 616, the engine 614 can search in the recognition center 620. Object and/or POI recognition can thus be dynamic and adaptive. In some embodiments, the pattern recognition engine 614 can be an object and/or POI recognition engine.

In some embodiments, the database 616 (i.e., the object data stored within) can be customized and tailored to the activities, habits, routines, etc. of the user. Over time, the database 616 can store more appropriate and relevant data. The database 616 can be adjusted such that the least accessed or least likely to be accessed data are replace with more relevant and more likely to be accessed data. In some embodiments, the database 616 is a hardware assisted small catalog embedded in the pattern recognition engine 614. In some embodiments, the database 616 can communicate with but is separate from the pattern recognition engine 614.

The pattern/recognition engine 614 can search for and recognize visualizations, such as images, sight, and light. The engine 614 can also be a small vocabulary embedded speech processing engine; in other words, the engine 614 can search for and recognize speech. Further, the engine 614 can search for and recognize visuals and sounds, such as video, other inputs (e.g., text), or any combination of such inputs. In some embodiments, the pattern/recognition engine 614 can also be a hardware assisted.

The augmented reality service 608 can host POI or object data to be accessed and/or downloaded. For example, POI data can be requested, accessed, and downloaded from the augmented reality service 608 to the database 616. The augmented reality service 608 can also provide processing power for an identification inquiry provided through a visual search. For example, if a match for an identification inquiry is not found in the local catalog, such a preloaded cache of POI data for a region the user is currently in, then the search can continue and be processed on the augmented reality service 608. In some embodiments, the augmented reality service 608 can also use context data (e.g., to filter out irrelevant POI or object data) in order to process the search for an identification inquiry more efficiently. In some embodiments, the augmented reality service 608 resides on a server and/or cloud on a network. The network can be any appropriate network, such as the Internet, a local area network (LAN), a cellular network, and the like. In some embodiments, the augmented reality service 608 can be a cloud and/or server based modularized object recognition center. The augmented reality service 608 can also be a visual, audio, and/or speech, etc. processing control center.

Moreover, it should be understood that system 602 can reside on the same server or be part of the same system residing on a different server as the augmented reality service 608. In this example, the computing device may comprises the sensor engine 604, the sensor hub 606, the at least one sensor (e.g., 610, 612), and the pattern/object recognition engine 614, the database 616, and the machine learning context engine 618 may reside with the augmented reality service 608. However, the system 602 may, in at least some embodiments, reside on the portable computing device. In this example, the system 602 or computing device can communicate with the augmented reality service 608 to access data thereon when needed. Further, various other features or approaches can be used or implemented within other systems utilizing other or similar features.

Figure 7:
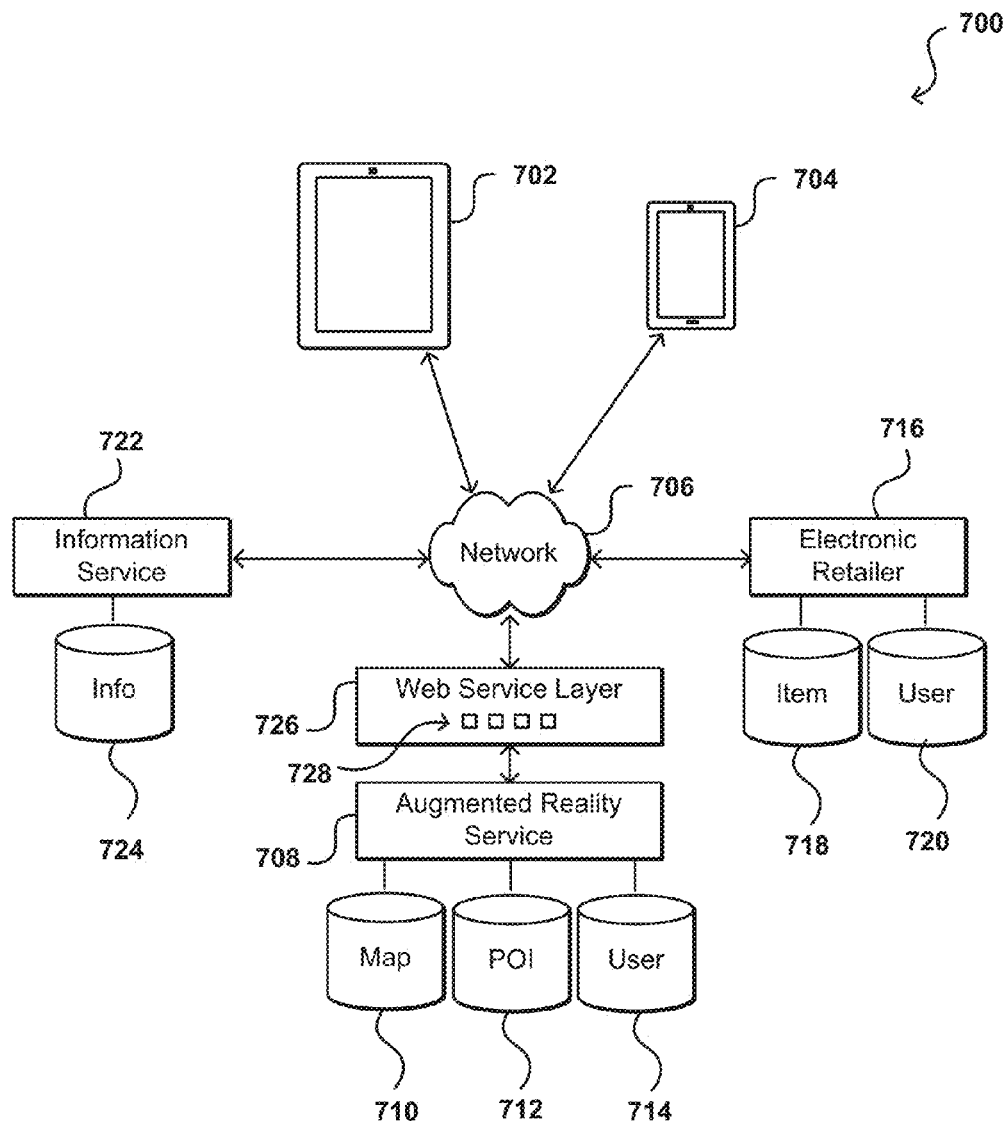
FIG. 7 illustrates another environment in which various embodiments can be implemented.

FIG. 7 illustrates another example environment 700 in which the system 602 of FIG. 6 can be implemented for a user to obtain context and location specific augmented reality information using one or more computing devices, in accordance with various embodiments. It should be understood that the example system provides a general overview of basic components, and that there can be many additional and/or alternative components utilized as known or used in the art for the generation, transmission, processing, management, and/or storage of electronic information. In this example, a user is able to utilize a computing device 702, such as a personal computer, tablet computer, smart phone, and the like, to access an augmented reality (AR) system or service 708 over at least one appropriate network 706, such as a cellular network, the Internet, or another such network for communicating digital information. In some embodiments, an augmented reality application will be installed on the computing device 702, such that much of the planning, information gathering, or other such aspects can be executed on the computing device, while the AR service 708 is contacted primarily to obtain point of interest data, location services, and other such information, which the AR service might pull from a map data store 710, a point of interest (POI) data store, and/or another such location. Various other interaction and execution approaches can be utilized as well within the scope of the various embodiments.

A user can use one of the computing devices 702, 704 to request, through the AR application, location specific information in a visual search by pointing a camera at an object, for example. The location specific information can include, for example, graphical banners or tags that show to location of various points of interest appearing in the live view displayed by the AR application. In many cases, the AR service 708 will pull the data from a map data store 710 or other such location, and a portion of a default set of POI stored in a POI data store 712, or other such location. The AR service might also include a user data store 714 for storing preference, account, or other such information for the user. The AR service can select the data appropriate for the visual search or request, and provide the data back over the at least one network 706 to the computing device 702 from which the request originated.

As mentioned, the POI data returned from the AR service can be selected from a default set of POI determined by a provider of the mapping service, or other such entity. This information can be obtained using conventional approaches, such as by accessing publicly accessible data to obtain information about public locations (e.g., parks and government buildings) or major attractions (ball parks, amusement parks, etc.). The AR service provider can also provide POI for locations corresponding to businesses or locations with which the AR has established a business relationship, whether directly or indirectly. For example, the AR service might display POI for gas stations or restaurant chains that have paid to be included with the POI data.

Systems and methods in accordance with various embodiments, however, can also enable information from other sources to be included as POIs as well. For example, as illustrated in FIG. 7 the AR system or service can include at least one Web service layer 726, or other such set of components, which can include one or more APIs 728, or other such interfaces, enabling data from third parties to be used with the AR service. It should be understood that the Web services layer can include any appropriate components known for receiving and processing Web service requests, as may include Web servers, routers, network infrastructure, and other such components. Further, although an Internet-based service layer is described, it should be understood that other such interface mechanisms can be used as well within the scope of the various embodiments. In this example, one or more third party content providers can use the APIs to inject POI data into the AR service 708, such that an AR application executing on a computing device 702, 704 can include additional types of POI that might be of more interest to a user of those devices.

As a first example, one of the content providers is an information service 722 that provides a certain type of information that is stored in at least one information data store 724 or other such location. The information can include, for example, housing data, rental data, information about types of organizations or businesses (e.g., doctors, veterinarians, health clinics), or other location specific information. The information also can include information related to interests of the user, such as locations where movies were filmed, locations mentioned in song lyrics, locations where video games or books allegedly took place, and places where certain types of items can be obtained, among many other such options.

In one example, the AR service might enable the information service 722 to provide information such as doctor locations, clinic locations, and the like, which might be automatically added to data as POIs. In other embodiments, a user might be able to request certain types of POI from one or more providers. For example, if a user is interested in finding an apartment for rent, the user can select an option to have that type of data shown in an overlay on the live view. When the AR service provides information for the view, the service can also provide rental information or POI obtained from a provider of that type of POI. In some embodiments, the AR service can determine whether a user has an account with a provider, and if so can have that information automatically added to the overlay information. For example, if a user has an account with a service that provides housing prices for the user's real estate, that information might automatically be added to the AR data. Similarly, if the user has an account with a social network, information from the social network can be obtained and used to provide POI in the live view. These POIs can include, for example, friends' houses, places of work, favorite places to visit, etc. In some cases, the actual location of one or more friends (as may be determined by a location of their phone, for example) might also be displayed as a POI. Various other types of information can be displayed as well.

As another example, an electronic retailer 716, or provider of an electronic marketplace, can provide information about products purchased, viewed, or otherwise obtained by the user. If a user of the AR service also has an account (or the same account) with an electronic retailer, as might be stored in a user data store 720, the AR service can contact the electronic retailer for information about the user (assuming the user approves, allows, or enables the transfer of such information). For example, the electronic retailer will typically store information about items (products, services, downloads, etc.), in an item data store 718 or other such location, that the user has obtained, borrowed, viewed, or otherwise expressed interest. There might be a number of locations associated with those items that might be presented as POIs to the user in the live view. For example, a user buying a toy car might be interested in locations where the user could view the actual car. A user buying a book might be interested in where the book was written or allegedly took place. A user buying clothes of a particular designer might be interested in locations where a user can purchase clothes from that designer. A user who buys coffee drinks or comics might be interested in locations where a user can purchase those types of items. Various other types of location information related to items can be utilized as well within the scope of the various embodiments. The electronic retailer can determine the relevant data from at least one item data store 718, or other such location, to provide to the AR service.

In the example situation of FIG. 7, the AR service can obtain a list or set of information about items associated with the user. This can include a list of specific items in which the user has expressed interest, types of items in which the user has expressed interest, related or recommended items, etc. In some cases, information obtained from the retailer might include data necessary to determine various POI that might be able to be provided to a user when the user views an area through the AR application that is associated with that POI. In at least some embodiments, information for the items (obtained from the retailer or another source) can be geo-coded or otherwise can include location information that can enable that data to be easily ported into, or used by, the mapping service and/or mapping applications. In some cases the AR service might contact the retailer and/or an information service periodically to obtain such information, while in other embodiments the contact might be made in response to specific actions or events triggered by the user.

Figures 8A, 8B:
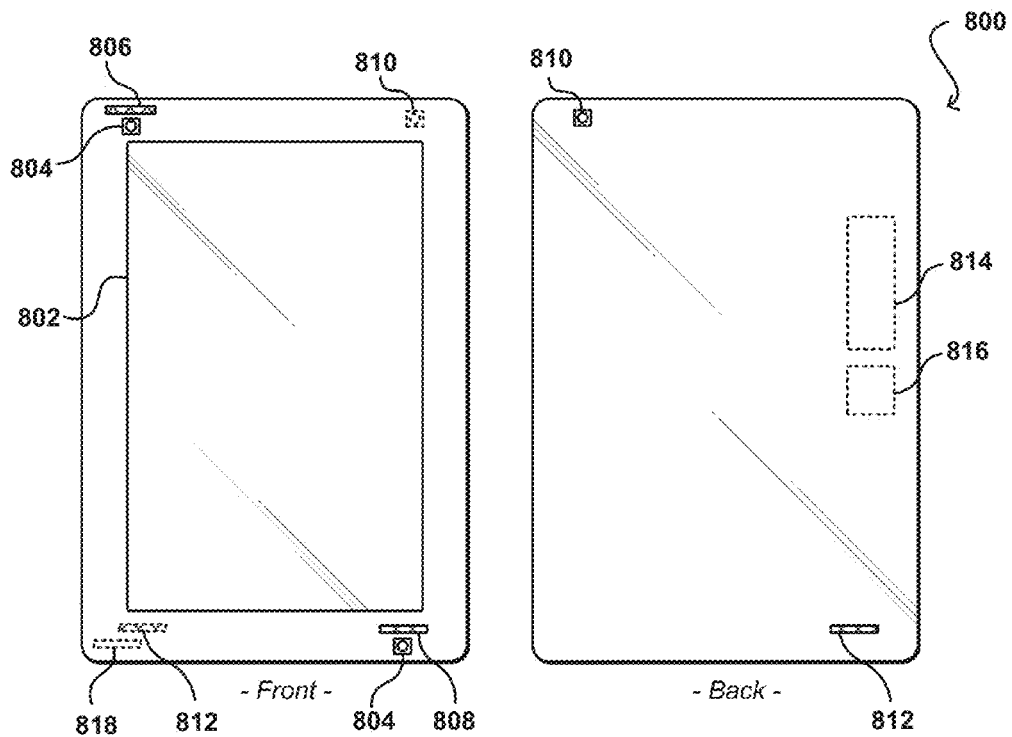
FIGS. 8A and 8B illustrate an example computing device that can be used to implement aspects of various embodiments.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
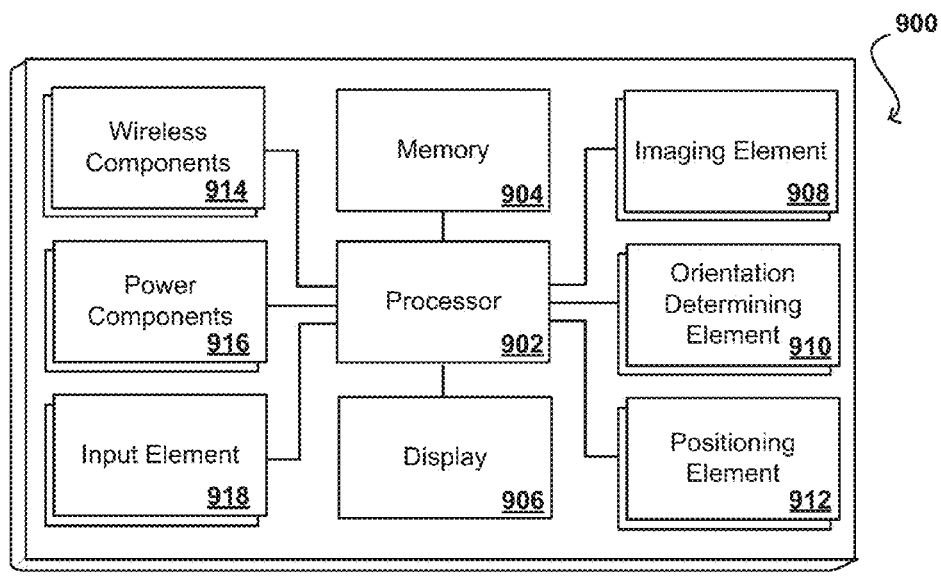
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under the control of one or more computer systems configured with executable instructions,
     receiving a first image and sensor data associated with the first image of a point of interest (POI) from a first user of a first computing device;
     recognizing the POI in the first image by comparing the first image to images stored for POIs within a predetermined distance of the first computing device;
     aggregating the first image with related images stored for the POI using the associated sensor data of the first image to determine a first view of the POI in the first image;
     receiving a second image and sensor data associated with the second image from a second user of a second computing device;
     recognizing the POI in the second image by comparing the second image to the images stored for the POIs within the predetermined distance of the second computing device;
     aggregating the second image with the first image and the related images stored for the POI using the associated sensor data of the second image to determine a second view of the POI in the second image; and
     based at least in part on the first image and the second image, refining placement of an augmented reality banner for the POI displayed in an overlay of a live view being captured with at least one camera of a third computing device, wherein the augmented reality banner includes at least name information of the POI;
     receiving feedback data indicating that the augmented reality banner for the POI is incorrectly named;
     determining that the feedback data meets a threshold accuracy level to generate a corrected augmented reality banner; and
     presenting the corrected augmented reality banner for the POI based at least in part on the feedback data.

2. The computer-implemented method of claim 1, wherein recognizing the POI includes using at least one of a scale-invariant feature transform (SIFT) or speeded up robust feature (SURF) algorithm.

3. The computer-implemented method of claim 1, further comprising:
   enabling subsequent users to provide additional images of the POI to further refine placement of the augmented reality banner in the overlay.

4. The computer-implemented method of claim 1, wherein the first image and the second image include location tags for the POI provided by the first user and the second user.

5. The computer-implemented method of claim 1, wherein the sensor data is data from at least one of a global positioning system (GPS) sensor, an electronic compass, a gyroscope, or an accelerometer.

6. A computer-implemented method, comprising:
   under the control of one or more computer systems configured with executable instructions,
     receiving at least one image of a point of interest (POI) from a user of a computing device;
     recognizing the POI in the at least one image;
     aggregating the at least one image with related images stored for the POI;
     based at least in part on a location of the POI in the at least one received image and the related images stored for a respective view of the POI, displaying an augmented reality banner for the POI in an overlay of a live view being captured with at least one camera of the computing device, the augmented reality banner includes at least name information of the POI;
     receiving feedback data indicating that the augmented reality banner for the POI is incorrectly named;
     determining that the feedback data meets a threshold accuracy level to generate a corrected augmented reality banner; and
     presenting the corrected augmented reality banner for the POI based at least in part on the feedback data.

7. The computer-implemented method of claim 6, further comprising:
   recognizing text in the at least one image associated with at least one sign using at least one of an optical character recognition engine or logo detection algorithm.

8. The computer-implemented method of claim 6, wherein receiving at least one image of the POI includes sensor data associated with the at least one image for at least determining the respective view of the POI.

9. The computer-implemented method of claim 8, further comprising:
   based at least in part on the sensor data associated with the at least one image, determining a view of the POI in the at least one image; and
   stitching the at least one image together with the related images stored for the respective view of the POI.

10. The computer-implemented method of claim 9, wherein the sensor data is data from at least one of a global positioning system (GPS) sensor, an electronic compass, a gyroscope, or an accelerometer.

11. The computer-implemented method of claim 6, further comprising:
    preloading images of POI within a predetermined distance of the computing device, wherein recognizing the POI includes comparing the at least one image to the preloaded images of POI.

12. The computer-implemented method of claim 6, further comprising:
    enabling users to provide feedback to correct a tag for an incorrectly tagged POI; and
    correcting the tag for the POI upon receiving a threshold amount of feedback.

13. The computer-implemented method of claim 12, wherein recognizing the POI includes using at least one of a scale-invariant feature transform (SIFT) or speeded up robust feature (SURF) algorithm.

14. The computer-implemented method of claim 6, further comprising:
    enabling subsequent users to provide additional images of the POI to further refine placement of the augmented reality banner in the overlay.

15. The computer-implemented method of claim 12, further comprising:
enabling users to tag an image with a geographic location of the POI.

16. A computing device, comprising:
a processor;
a display screen; and
memory including instructions that, when executed by the processor, cause the computing device to:
receive at least one image of a point of interest (POI) from a user of a computing device;
recognize the POI in the at least one image;
aggregate the at least one image with related images stored for the POI;
based at least in part on a location of the POI in the at least one received image and the related images stored for a respective view of the POI, display an augmented reality banner for the POI in an overlay of a live view being captured with at least one camera of the computing device, the augmented reality banner includes at least name information of the POI;
receive feedback data indicating that the augmented reality banner for the POI is incorrectly named;
determine that the feedback data meets a threshold accuracy level to generate a corrected augmented reality banner; and
present the corrected augmented reality banner for the POI based at least in part on the feedback data.

17. The computing device of claim 16, wherein the instructions, when executed by the processor, further enable the computing device to:
based at least in part on the sensor data associated with the at least one image, determine a view of the POI in the at least one image; and
stitch the at least one image together with the related images stored for the respective view of the POI.

18. The computing device of claim 16, wherein the augmented reality tag is displayed in the overlay of the live view in response to a visual search query by the user.

19. The computing device of claim 16, wherein the instructions, when executed by the processor, further enable the computing device to:
enable subsequent users to provide additional images of the POI to further refine placement of the augmented reality banner in the overlay.

20. A non-transitory computer-readable storage medium storing instructions that, when executed by at least one processor, cause a computing device to:
receive at least one image of a point of interest (POI) from a user of a computing device;
recognize the POI in the at least one image;
aggregate the at least one image with related images stored for the POI;
based at least in part on a location of the POI in the at least one received image and the related images stored for a respective view of the POI, display an augmented reality banner for the POI in an overlay of a live view being captured with at least one camera of the computing device, the augmented reality banner includes at least name information of the POI;
receive feedback data indicating that the augmented reality banner for the POI is incorrectly named;
determine that the feedback data meets a threshold accuracy level to generate a corrected augmented reality banner; and
present the corrected augmented reality banner for the POI based at least in part on the feedback data.

21. The non-transitory computer-readable storage medium of claim 20, wherein the augmented reality tag is displayed in the overlay of the live view in response to a visual search query by the user.

22. The non-transitory computer-readable storage medium of claim 20, wherein aggregating the images includes:
based at least in part on the sensor data associated with the at least one image, determine a view of the POI in the at least one image; and
stitch the at least one image together with the related images stored for the respective view of the POI.

23. The non-transitory computer-readable storage medium of claim 20,
preload images of POI within a predetermined distance of the computing device.

24. The non-transitory computer-readable storage medium of claim 23, wherein recognizing the POI includes comparing the at least one image to the preloaded images of POI.

25. The non-transitory computer-readable storage medium of claim 24, wherein recognizing the POI includes using at least one of a scale-invariant feature transform (SIFT) or speeded up robust feature (SURF) algorithm.

\* \* \* \* \*